A. RAICHE.
HOOK SETTING MACHINE.
APPLICATION FILED JUNE 16, 1911.
1,036,710.
Patented Aug. 27, 1912.
6 SHEETS—SHEET 1.
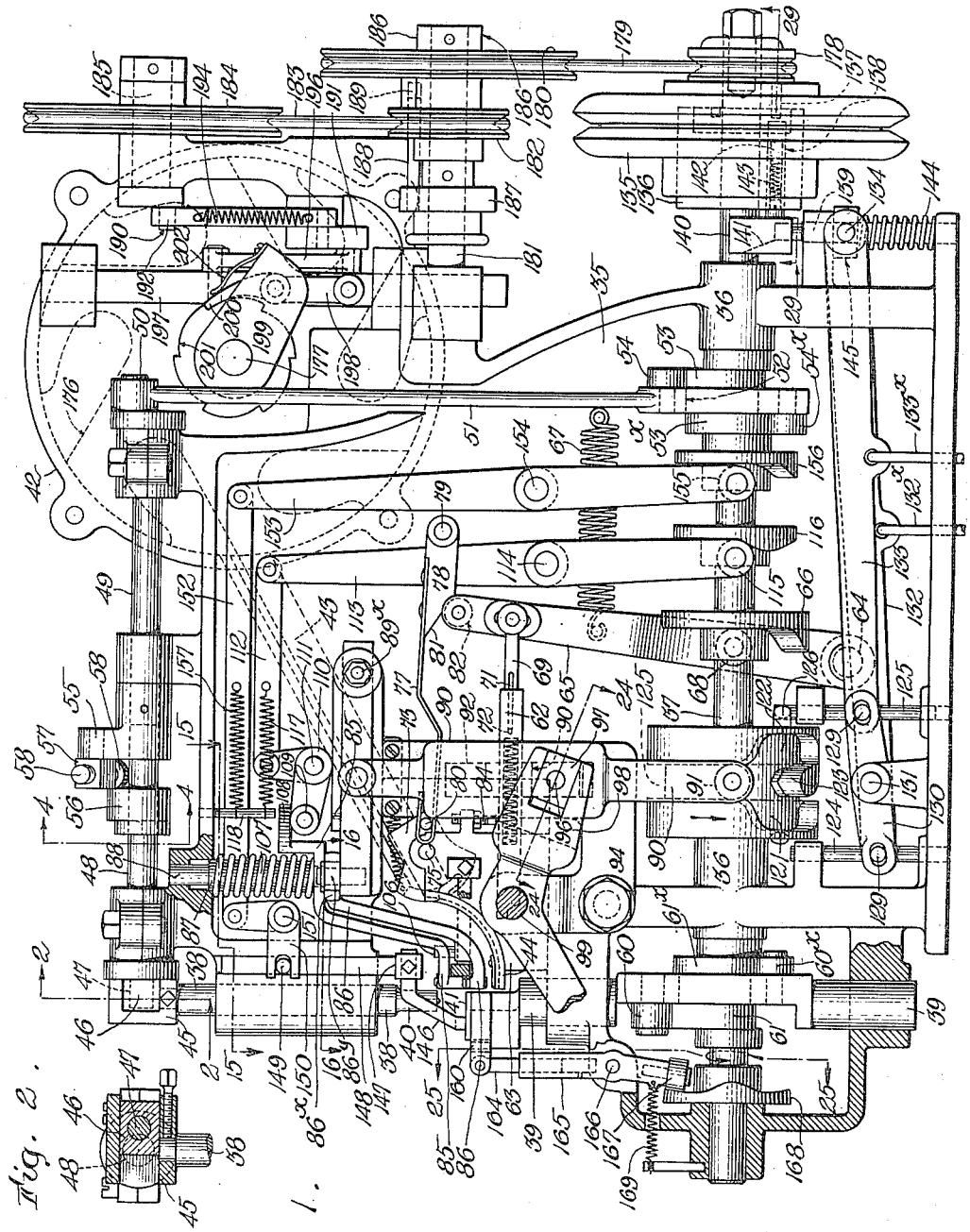
Witnesses:
W. P. Abell
F. R. Raulstone
Inventor:
Andrew Raiche,
by Wright Brown Quinby May
Attorneys.

A. RAICHE.
HOOK SETTING MACHINE.
APPLICATION FILED JUNE 16, 1911.
1,036,710.   Patented Aug. 27, 1912.
6 SHEETS—SHEET 2.
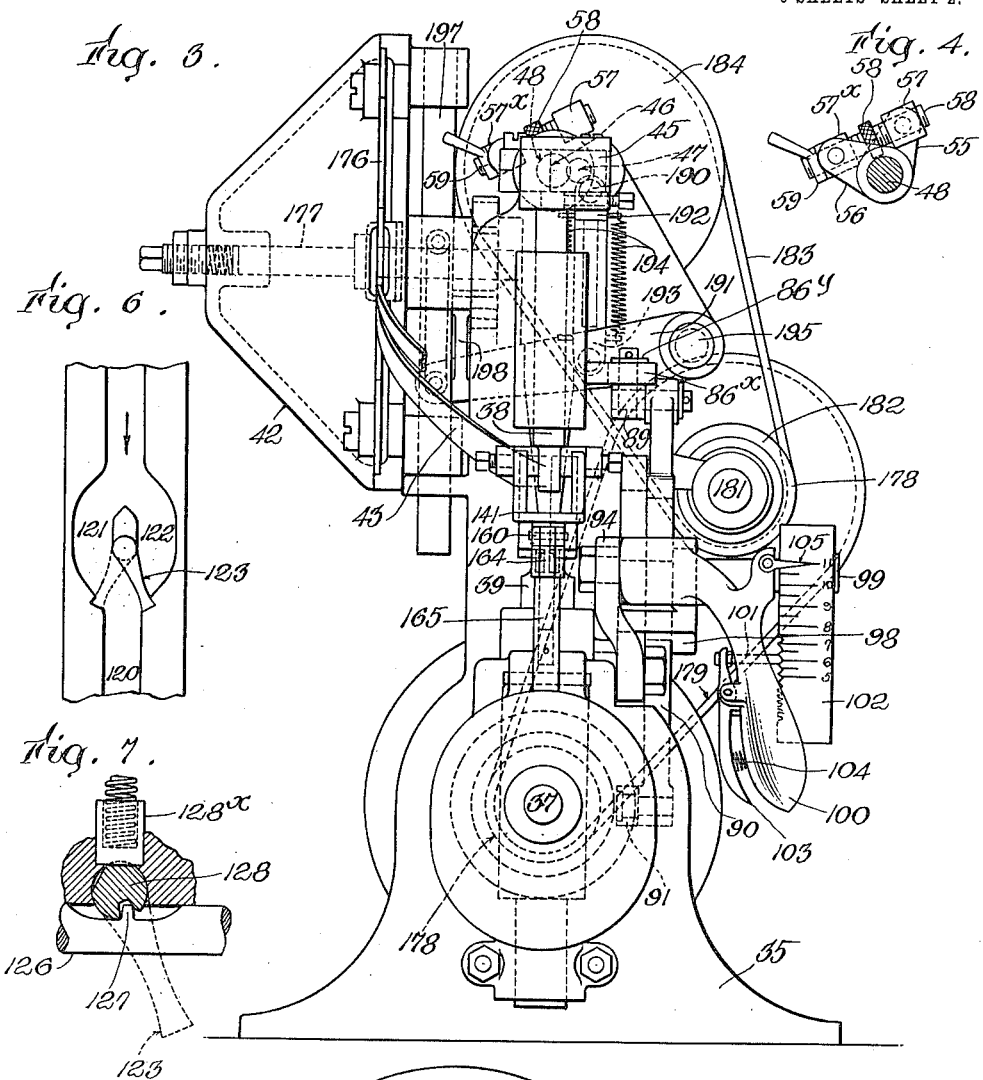
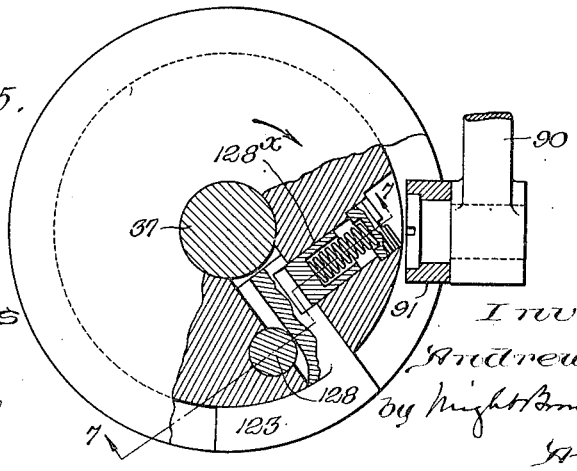

A. RAICHE.
HOOK SETTING MACHINE.
APPLICATION FILED JUNE 16, 1911.
1,036,710.
Patented Aug. 27, 1912.
6 SHEETS—SHEET 3.
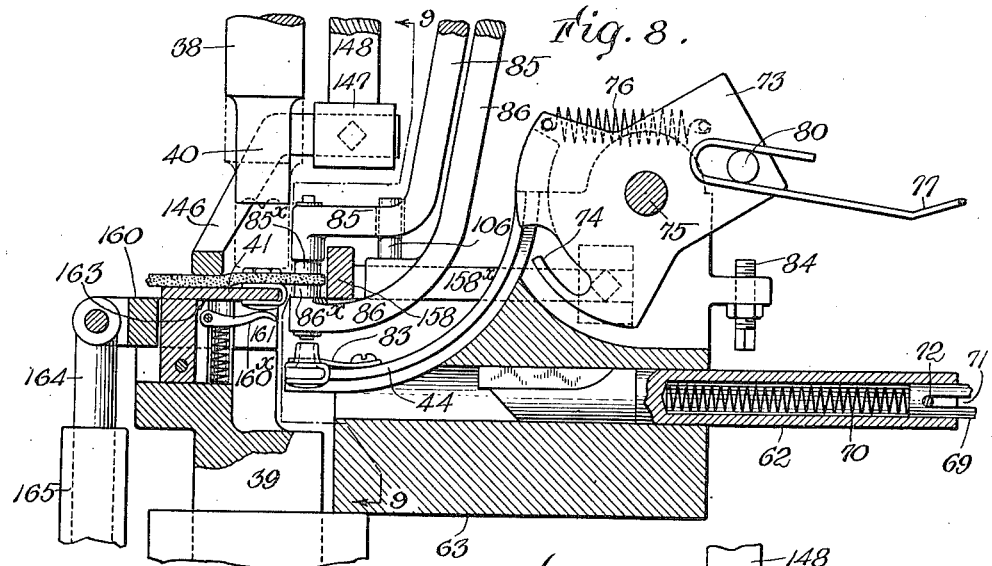
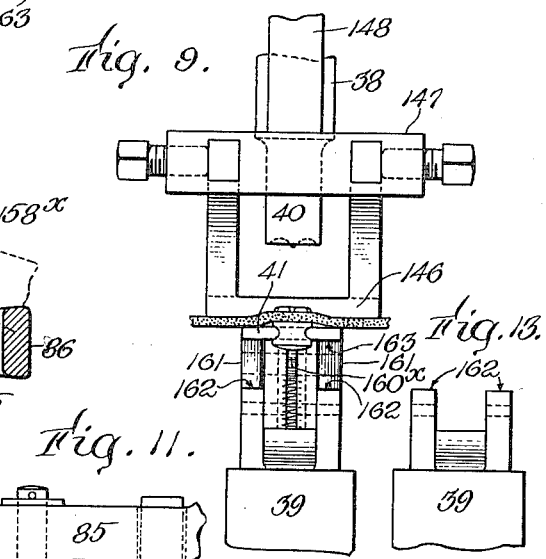
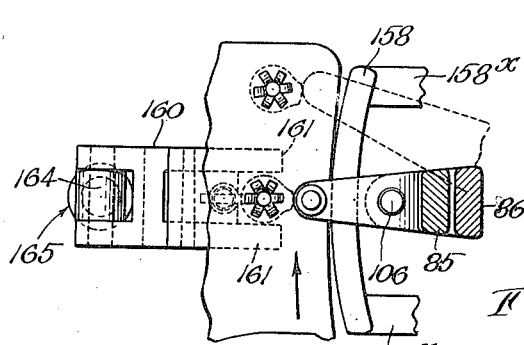
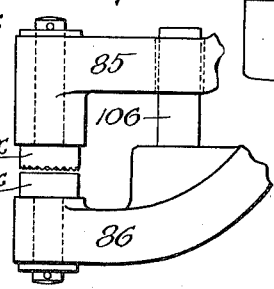
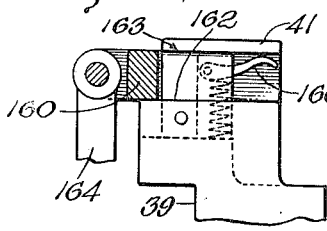
Witnesses:
W. P. Abell
F. R. Roulstone
Inventor:
Andrew Raiche,
by Wright Brown Quimby May
Attorneys.

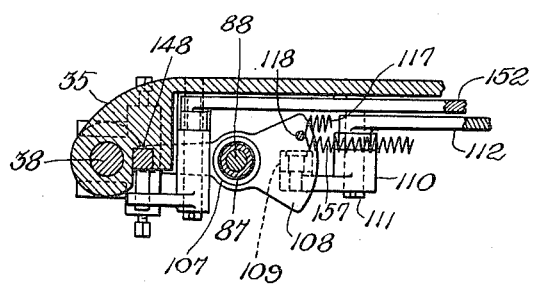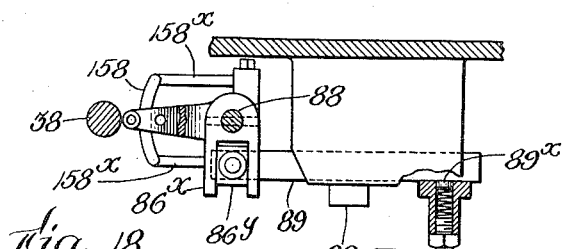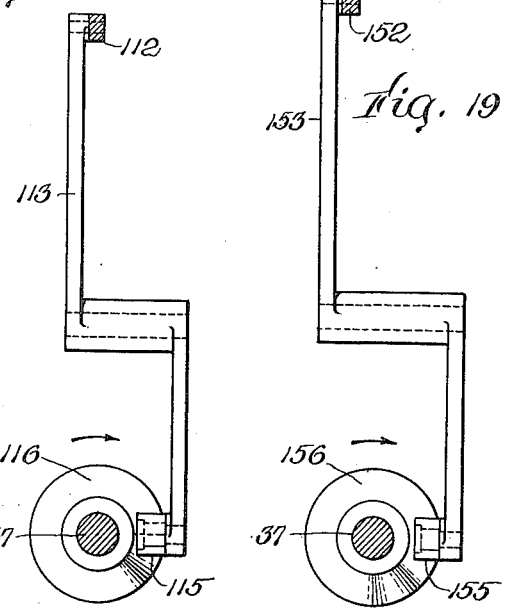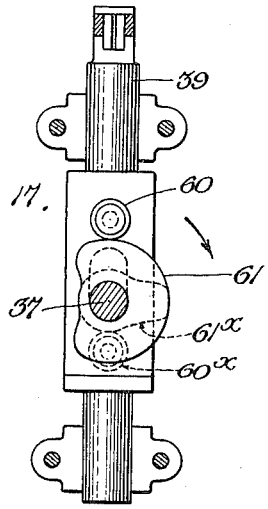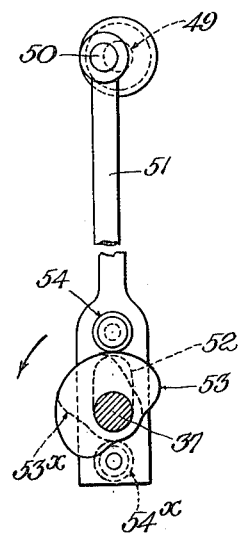

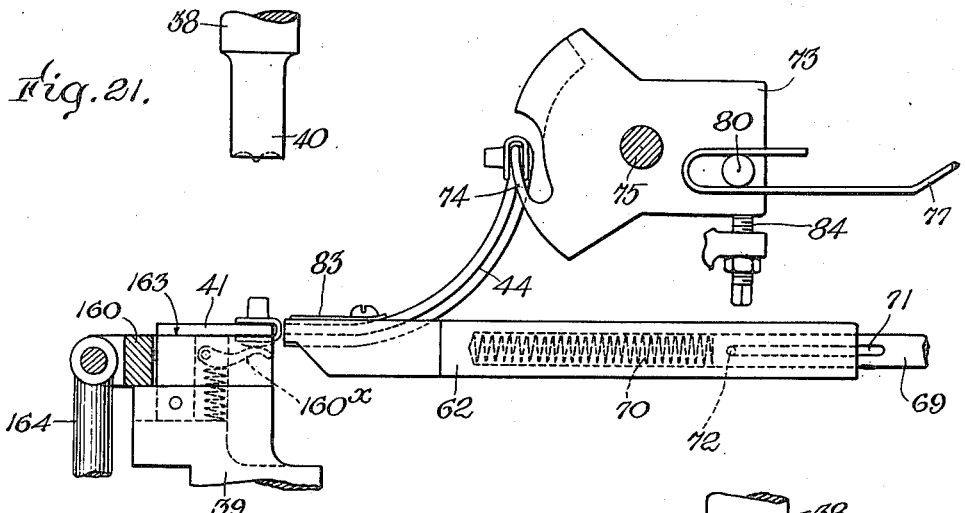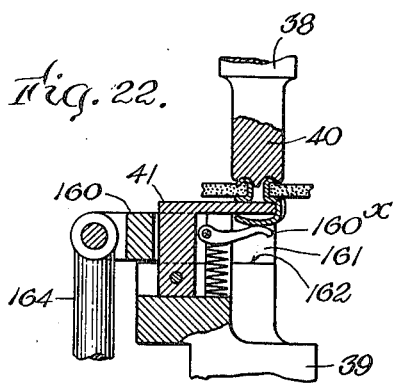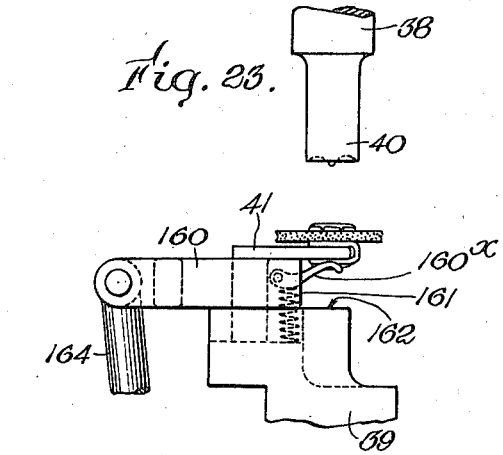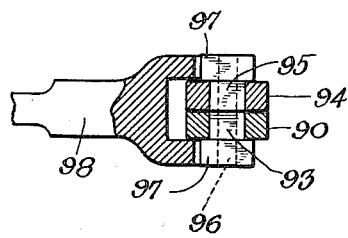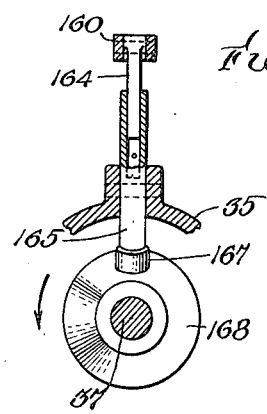

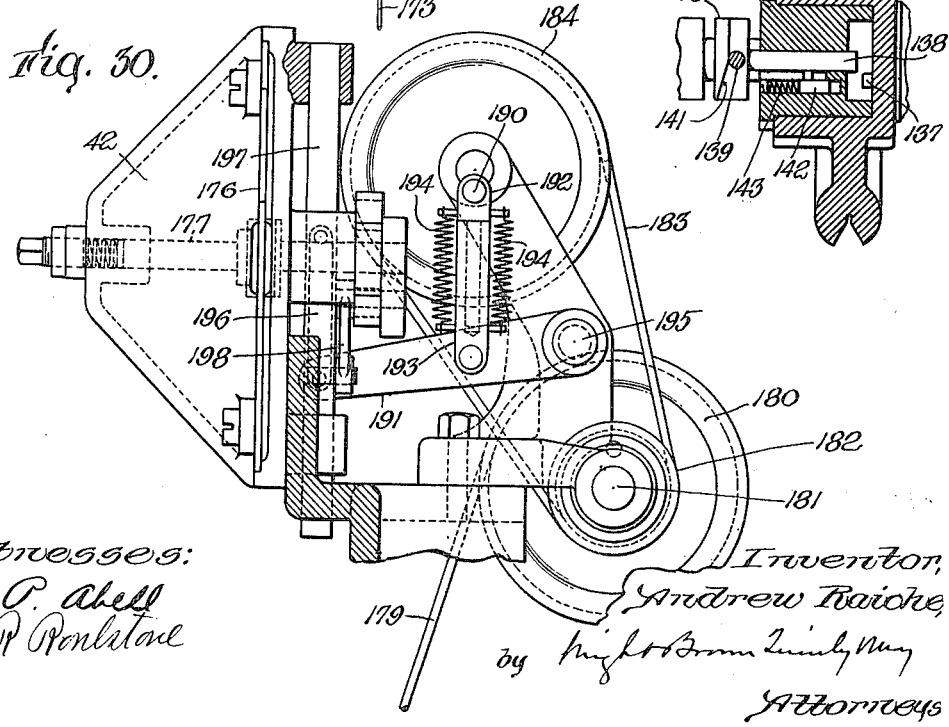

UNITED STATES PATENT OFFICE.

ANDREW RAICHE, OF FAIRHAVEN, MASSACHUSETTS, ASSIGNOR TO ATLAS TACK COMPANY, OF FAIRHAVEN, MASSACHUSETTS, A CORPORATION OF NEW JERSEY.

HOOK-SETTING MACHINE.

1,036,710.   Specification of Letters Patent.   Patented Aug. 27, 1912.

Application filed June 16, 1911. Serial No. 633,474.

*To all whom it may concern:*

Be it known that I, ANDREW RAICHE, of Fairhaven, in the county of Bristol and State of Massachusetts, have invented certain new and useful Improvements in Hook-Setting Machines, of which the following is a specification.

This invention relates to machines for setting lacing hooks, and particularly to those which are used for operating upon shoe uppers. There are two types of machines for this purpose, namely, those which insert the hooks one at a time and those which insert a plurality of hooks at one time.
This invention relates to the type in which the hooks are inserted one at a time and in which the work is fed step by step between the setting operations.

One of the important features of the invention is the means for feeding the work step by step. The feeding means is adapted to feed the work in one direction or in the opposite direction at the will of the operator. An advantage of this type of feeding means is that the usual special gage for positioning the work at the outset of a setting operation may be omitted and the hooks may be correctly located in the work by causing the feeding means to feed the work from right to left when operating upon one side of an upper and from left to right when operating upon the other side of the upper. Each side of the upper is placed in the machine in such position as to insert the first hook at the top of the upper, and as the work is fed it moves from the top toward the bottom of the upper. It is a comparatively simple matter to locate the top hook in an upper, but it is comparatively difficult to locate the hooks in one side of the upper in the same relative position as those in the other side of the upper when one series of hooks is inserted by beginning at the top and the other series is inserted by beginning at the bottom and feeding toward the top. Any convenient part of the machine may serve in the present instance as a gage for locating the top edge of the upper when placing the work in operative position, thus dispensing with a special gage for that purpose.

Another important feature of the invention is the combination of hook inserting mechanism and hook feeding mechanism which makes the usual work plate unnecessary. The work is fed, in the present case, by novel feeding mechanism comprising a pair of coöperative jaws which are closed and opened so as to grip and release the work and which are reciprocated laterally to effect the step by step feeding movement. The jaws are operated so as to return to the same position after each feeding step. When the work is released by the feeding jaws it is held in position by a yielding presser-foot which coöperates with the hook-supporting member. The work is thus held at all times by some part of the operating mechanism so that it cannot become dislodged. The omission of the usual work plate or table facilitates the positioning and feeding of the work because it leaves a clear unobstructed space for the hands of the operator. The advantage of this feature is especially important in operating upon what is known as blind hook work.

The hook-supporting member is provided with a hook-positioning member which has separate confronting portions adapted to embrace a hook between them while the hook is on the supporting member, for the purpose of maintaining the hook in the line of the anvil. The hook-positioning member is adapted to be withdrawn from operative position to free the work preparatory to each feeding movement. In this embodiment of the invention the hook-supporting member has a movement toward and from the anvil, but it is fixed as to lateral movement. The hook-positioning member is so mounted as to move toward and from the anvil with the hook-supporting member, and it is provided with mechanism for retracting it laterally at the appropriate time with relation to the feeding operation. The construction and operation of the hook-positioning member are such that the work may be fed in either direction when the hook-positioning member is retracted.

In conjunction with the reversible feeding mechanism, the machine is provided with a driving clutch and starting mechanism whereby the operator may first select the direction of feeding movement and then set the driving clutch by a single movement of the starting treadle.

The invention comprises various other improvements, all of which are illustrated upon the accompanying drawings and described in the following specification.

Referring to the drawings: Figure 1 represents a right side elevation of the machine with a portion of the casing broken away to expose the operating mechanism. Fig. 2 represents a vertical section of a portion of the mechanism for operating the anvil, as indicated by line 2—2 in Fig. 1. Fig. 3 represents a front elevation of the machine. Fig. 4 represents a detail in section of a device for adjusting the range of movement and the pressure of the anvil, as indicated by line 4—4 in Fig. 1. Fig. 5 represents an elevation, partly in section, of a cam which is adapted to operate the feeding jaws so as to feed the work from left to right or from right to left. Fig. 6 represents a development of a portion of the cam. Fig. 7 represents a section of mechanism by which the cam may be caused to feed in one direction or the other, as indicated by line 7—7 in Fig. 5. Fig. 8 represents a vertical section of the hook-setting mechanism, work-feeding jaws and hook-feeding mechanism. Fig. 9 represents a rear elevation of the presser-foot and a hook-supporting member as indicated by line 9—9 in Fig. 8. Fig. 10 represents a horizontal section through the feeding jaws, and includes portions of the work, a work guide and a hook-supporting member. Fig. 11 represents, on a larger scale, an elevation of the work-engaging portions of the feed jaws. Fig. 12 represents an elevation of the hook-supporting member with the hook-positioning member drawn in section. Fig. 13 represents a rear elevation of the upper end of the plunger which carries the hook-supporting member. Fig. 14 represents an inverted plan view of the hook-supporting member. Fig. 15 represents a horizontal section in the planes indicated in Fig. 1 by line 15—15. Fig. 16 represents a horizontal section of the work-feeding mechanism in a plane indicated in Fig. 1 by line 16—16. Fig. 17 represents a front elevation of the plunger which carries the hook-supporting member. Fig. 18 represents an elevation of the cam and lever which open the work-feeding jaws. Fig. 19 represents an elevation of the cam and lever which raise the presser-foot. Fig. 20 represents an elevation of the cams and connecting rod which operate the anvil plunger. Fig. 21 represents a right side elevation, partly in section, of the mechanism for placing the hooks upon the hook-supporting member. Fig. 22 represents an elevation, partly in section, of the hook-setting mechanism in the act of clenching a hook in the work. Fig. 23 represents an elevation of the hook-setting mechanism with the anvil raised after having clenched the hook, and the hook-positioning member retracted to permit feeding movement of the work. Fig. 24 represents a section through a device for varying the length of feeding movement of the feed jaws, the section being taken on line 24—24 of Fig. 1. Fig. 25 represents the cam for retracting the hook-positioning member, and the operating connections between the cam and said member. Fig. 26 represents a right side elevation of a hand lever by which the feeding movement of the work may be increased or decreased. Fig. 27 represents an elevation of the cam and cam lever which operate the plunger for placing a hook upon the hook-supporting member. Fig. 28 represents a top plan view of the work-feeding cam and portions of the mechanism which control the direction of feed. Fig. 29 represents a section of the driving clutch and controlling mechanism therefor. Fig. 30 represents a front elevation, partly in section, of the hook reservoir and the mechanism for feeding hooks into the raceway. Fig. 31 represents a perspective view of manually operative means for raising the presser-foot and opening the work-feeding jaws.

The same reference characters indicate the same parts wherever they occur.

The several mechanisms are mounted in a frame 35 which is provided with bearings 36 for a main power shaft 37. The hook-setting mechanism comprises coöperative members which are carried respectively by plungers 38 and 39. These plungers are mounted in suitable bearings at the front of the frame 35 and are adapted to move vertically toward and from each other. The upper plunger carries an anvil, indicated at 40, and the lower plunger carries a hook-supporting member indicated at 41.

The construction of the hook-supporting member is best shown by Figs. 9, 12, 14 and 22. The member 41 is affixed in a recess in the upper end of the plunger 39, and it comprises a lip or plate which is adapted to occupy the throat of a hook, as shown by Fig. 22. The hooks are conducted from a suitable reservoir 42, hereinafter described, by a main raceway 43 from which they are transferred one by one by a suitable feeding device to an auxiliary hook race 44. The lower end of the race 44 is located in a plane below the plane of the work, and the hooks are transferred from it to the supporting member 41 when the latter is at its lowest position. The operation of the anvil 40 and hook-supporting member 41 is as follows: When the machine is at rest, the anvil 40 and the hook-supporting member 41 are both raised to their highest positions, as shown by Fig. 1. When the machine is set in motion, both members 40 and 41 descend, the member 40 descending to operative position and the member 41 descending to receive a hook from the race 44. The member 40 is first to arrive at operative position, and the member 41 thereafter moves upwardly, thereby inserting the shank of the hook through the work and clenching it against the anvil. Immediately following the completion of the setting operation, the anvil is raised and the work is fed while the hook-supporting member 41 remains stationary in its highest position.

The anvil 40 is reciprocated by the following mechanism, which is illustrated by Figs. 1, 2 and 20: The upper end of the plunger is provided with a head 45, which is provided with a transverse groove for the reception of a sliding block 46. The block 46 is carried by a wrist pin 47 affixed to a rock shaft 48. The rock shaft 48, mounted in suitable bearings on the frame 35, receives its motion from a rock shaft 49 which is arranged in alinement with it and to which it is connected by an adjustable connection whereby the shaft 48 may be adjusted to shift the range of movement of the plunger. The rear end of the shaft 49 is provided with a wrist pin 50. The wrist pin is oscillated by a connecting rod 51 whose lower end is formed with a slot 52 through which the main shaft 37 extends. Cams 53 and 53$^x$ affixed upon the shaft coöperate respectively with cam rolls 54 and 54$^x$ mounted upon the connecting rod 51 and furnish the movement for operating the anvil. The adjustable connection between the shafts 48 and 49 is shown in detail by Fig. 4. The forward end of the shaft 49 is provided with a lever 55, and the shaft 48 is provided with a lever 56. The lever 55 is provided with a threaded block 57 which is connected to it by a swivel connection, and the lever 56 is provided with a similar block 57$^x$ which is likewise threaded and swiveled. The threads in the two blocks are respectively right-hand and left-hand, to coöperate with corresponding threads upon a turnbuckle 58 by which they are connected. When the turnbuckle is rotated it turns the lever 56 in one direction or the other with relation to the lever 55 and thereby shifts the range of movement of the anvil to a corresponding degree. The turnbuckle is provided with a check nut 59 which is provided with a suitable handle by which it may be turned to force it against one of the blocks. As shown by Fig. 1, the rear end of the shaft 48 abuts against the forward end of the shaft 49 within the hub of the lever 55, the hub constituting a bearing for the shaft 48.

The mechanism for operating the lower plunger 39 is shown by Figs. 1 and 17. The plunger is provided with cam rolls 60 and 60$^x$ which are engaged respectively by cams 61 and 61$^x$ affixed upon the shaft 37.

The device for transferring the hooks one by one from the race 44 to the hook-supporting member 41 is shown by Figs. 1, 8 and 21. The lower end of the race 44 is in alinement with a plunger 62 which is fitted to slide in a bracket 63 attached to the frame 35. The slide is reciprocated by a lever 65 pivoted at 64 to the frame 35. The lever is moved forward by a cam 66 on the shaft 37 and is moved backward by a spring 67. The cam engages a roll 68 mounted on the lever. For the purpose of avoiding breakage of the parts in case a hook becomes stuck in the raceway 44, the connection between the lever 65 and the plunger 61 is made yielding. For this purpose the plunger is bored to receive a connecting rod 69 and a compression spring 70. The rod 69 is formed with a longitudinal slot 71 which is occupied by a transverse pin 72 in the plunger. Although the forward movement of the lever 65 is positive, the forward movement of the plunger is yielding, and inasmuch as the backward movement of the lever 65 is effected by the spring 67 the backward movement of the plunger is likewise yielding.

The device for feeding the hooks one by one from the main raceway 43 to the raceway 44 is shown by Figs. 1, 8 and 21. The feeding device, which is of well known construction, is in the form of a lever, indicated at 73. The lever is provided with a lip 74 which moves to and from alinement with the lower end of the raceway 43 in a well known manner. The feeding device is mounted upon a fulcrum stud 75 and is turned in one direction by a spring 76 and in the other direction by a lever which receives its motion from the lever 65. The lever which acts directly upon the feeding device is preferably made so that its action upon said device will be yielding, in order to avoid breakage of the parts in case a hook becomes stuck in the feeding device or in either of the raceways. The operating lever for the feeding device 73 is indicated at 77. This lever consists of a strip of flexible sheet metal affixed to a holder 78 mounted upon a fulcrum pin 79 projecting from the frame 35. The free end of the flexible strip 77 is bent backward as shown by the drawings so that it may embrace a wrist pin 80 carried by the feeding device. The free end of the holder 78 is beveled as indicated at 81 for coöperation with a roll 82 mounted at the upper end of the lever 65. When the lever 65 is moved forward by its cam, the feeding device 73 is raised by the spring 76 and also by the weight of the lever 77. When the lip 74 of the feeding device is at its highest position, as shown by Fig. 21, it is adapted to receive a lacing hook from the main raceway 43. When the lever 65 is drawn back by its spring 67, the roll 82 at the free end of the lever 65 engages the beveled face 81 and raises the lever 77 so as to move the feeding device to the position shown in Figs. 1 and 8. This movement of the feeding device retracts the lip 74 from the hook and permits the hook to descend to the lower end of the raceway 44. A yielding check finger 83 is attached to the lower end of the raceway 44 to prevent the hook from sliding off the end of the raceway. The check finger is displaced to permit the transfer of the hook when the plunger 62 is thrust forward. The bracket 63 is provided with an adjustable stop screw 84 which is adapted to be engaged by a portion of the feeding device 73 for the purpose of positioning the lip 74 in the desired position to receive a hook from the raceway 43.

The feeding jaws for feeding the work step by step are illustrated by Figs. 1, 8, 10, 11, 15 and 16. The feeding jaws are in the form of levers according to this embodiment of the invention and are indicated respectively at 85 and 86. The free ends of the feed jaws are preferably provided with swivel work-engaging members $85^x$ and $86^x$ (Fig. 11) which enable the work to be turned or guided as desired. The lever 85 is formed with a sleeve 87 and is loosely mounted upon a vertical pin 88. The lever 86 (see Fig. 16) is affixed in any suitable way to the pin 88. The pin is mounted to oscillate in suitable bearings in the frame 35. The lever 86 is oscillated by a plunger 89, and for this purpose it is provided with a slotted arm $86^x$ which is engaged by a block $86^y$ swiveled upon the slide 89. The slide is mounted in a guide on the frame 35 and is engaged by a friction device $89^x$ which prevents backlash. (See Fig. 16.) The slide is pivotally connected to the upper end of an operating lever 90. The lower end of the lever 90 is provided with a cam roll 91 which coöperates with a cam, hereinafter described, by which it may be oscillated to impart feeding movement of the jaws 85, 86, either from right to left or from left to right. The fulcrum for the lever 90 is herein shown in adjustable form whereby it may be shifted to increase or decrease the length of feeding movement imparted to the feed jaws. As shown by Fig. 1, the lever 90 is provided with a longitudinal slot 92. This slot is occupied by a sliding block 93. A bracket 94 affixed to the frame 35 is provided with a slot similar to the slot 92 but which does not appear in Fig. 1 because it is coextensive with the slot 92 and is concealed by the lever 90. A sliding block 95 similar to the block 93 is arranged in the aforesaid slot in the bracket 94. A pin 96 extends through both blocks 93 and 95 and projects in both directions beyond the lever 90 and bracket 94. (See Fig. 24.) The ends of the pin 96 bear in blocks 97, 97, which are engaged by the forked ends of a split lever 98. The lever is mounted upon a fulcrum stud 99 and is provided with a handle 100 by which it may be oscillated to shift the pin 96 which is the fulcrum for the lever 90.

Referring to Figs. 3 and 26, the handle 100 is provided with a sliding pin 101 which is adapted to coöperate with a notched sector 102 which is clamped upon the stud 99 and is adapted to be adjusted about the stud. A finger lever 103 carried by the handle 100 is connected to the pin 101 and is subject to the force of a spring 104 by which the pin is normally held in engagement with the sector 102. The sector is preferably provided with a series of index marks as shown by Fig. 3, and the handle 100 is provided with an index member 105 adapted to coöperate with the index marks to indicate the desired adjustment of the handle.

The feed jaw 86 has near its free end a stud 106 which projects through a hole in the jaw 85 as shown by Figs. 1, 10 and 11. This stud transmits feeding movement from the jaw 86 to the jaw 85. The jaw 86 has no movement other than oscillatory movement about the axis of its pin 88, but the jaw 85 is moved toward and from the jaw 86 to effect the necessary opening and closing of the jaws to release and grip the work. The jaws are normally closed by a spring 107 (see Fig. 1) which is coiled about the sleeve 87 and which is compressed between the jaw and a convenient portion of the frame 35. The jaw 85 is opened against the force of the spring by a suitable cam and connections. (See Fig. 15). For this purpose the jaw 85 is provided with an arm 108 which is arranged to be engaged by a roll 109 carried by one arm of a bell crank 110. The bell crank is mounted upon a fulcrum pin 111 projecting from the frame 35 and is connected by a link 112 with the upper end of an operating lever 113. The lever is mounted upon a fulcrum pin 114 projecting from the frame 35 and is provided with a roll 115 which coöperates with a cam 116 affixed to the shaft 37. The connections between the cam and the feed jaw operated positively by the cam to open the jaw and are operated in the opposite direction to close the jaw by a spring 117 one end of which is attached to the link 112 and the other end of which is attached to a fixture 118. The area of the arm 108 is such that some portion thereof will always be in coöperative relation with the roll 109 notwithstanding oscillatory movement of the arm.

The feeding jaws are operated so that they may move in either direction from a median position. The jaws are closed in every instance when they are in said median position, and the feeding movement begins when the jaws are in the median position so that the work will be fed from right to left if the jaws are moved from their median position to the left, or will be fed to the right if the jaws are removed from their median position to the right. The jaws release the work after each step and return to their median position to take a fresh hold upon the work.

Feeding movement for the jaws is produced by a cam which is fixed upon the shaft 37 and which engages the roll 91 on the feed lever 90. This cam is illustrated by Figs. 1, 5, 6, 7 and 28. As shown by Figs. 1, 6, and 28, the cam has a median groove 120 and two branch grooves indicated at 121 and 122. A switch 123 carried by the cam disk is adapted to guide the cam roll 91 into the branch 121 or into the branch 122, as the case may be, depending upon its position. As shown by solid lines in Fig. 6, the switch member is in position to deflect the cam roll into the branch 121, while the dotted lines in said figure indicate the other position of the switch which would deflect the cam roll into the branch 122. The switch member may remain in either position indefinitely so as to cause step by step feeding movement exclusively in one direction or the other, or it may be shifted from time to time regardless of the number of step by step feeding movements for the purpose of reversing the direction of feeding movement.

The desired position of the switch member may be selected at will and is determined by the positions of two controlling pins indicated in Figs. 1 and 28 at 124 and 125. The pins 124 and 125 are mounted in suitable bearings in the frame 35, one on either side of the cam. The pins are movable longitudinally in their bearings, and their upper ends are adapted to coöperate with the ends of a sliding member 126 mounted in the cam disk so as to be movable endwise therein in parallelism to the axis of the cam. The ends of the sliding member 126 are beveled, as shown by Fig. 28, and they project slightly beyond the end faces of the cam disk. Referring to Fig. 7, a tooth 127 is formed upon the slide midway between its ends. This tooth coöperates with an oscillatory stud 128 in the same relation as a rack and pinion, the tooth 127 constituting the rack, and the stud 128 being provided with a single notch to receive the tooth and constituting the pinion. The switch member 123 is preferably formed upon the stud 128, although it may be formed as a separate member and rigidly attached to the stud, if desired. A spring follower 128$^x$ coacts with either of two flat faces on the stud to hold the switch member in either of its extreme positions. So long as the pin 125 is depressed, the switch member will remain in the position shown by Fig. 7 and by solid lines in Fig. 6, regardless of the number of revolutions of the cam. When it is desired to shift the switch member, the pin 125 is raised so that it will intercept the path of rotation of the right-hand end of the slide 126 and the pin 124 is depressed so that it will be out of the path of rotation of the left-hand end of the slide. The right-hand end of the slide will therefore strike against the pin 125 when the cam is driven, and the slide will be shifted to the left as the result of the coöperation of the beveled end with the pin 125. This movement of the slide will be transmitted through the tooth 127 and stud 128 to the switch member, and the switch member will be shifted to the left. The switch member may thereafter remain in its left-hand position through an indefinite number of revolutions of the cam until the pin 124 is raised and pin 125 depressed. The shifting of the pins 124 and 125 in this way controls the position of the switch member, but the motive power by which the switch member is shifted is furnished in each instance by the movement of the cam in conjunction with the pins 124 and 125.

The means for shifting the pins 124 and 125 comprises the following mechanism, shown by Fig. 1: Each pin is provided with a transverse stud, the studs being indicated at 129. The studs are connected by a lever 130 pivoted at 131. The lever causes the studs to move in unison in opposite directions. The stud on the pin 124 is engaged by a lever 132, and the stud on the pin 125 is engaged by a lever 133. The two levers are mounted upon a fulcrum stud 134, and they are provided with rods indicated respectively at 132$^x$ and 133$^x$. These rods may extend to treadles (not shown). The controlling mechanism for the switch is adapted to be operated in conjunction with a starting clutch for the shaft 37 so that the operator, by depressing a single treadle, may first place the pins 124, 125, in position to effect the desired shifting of the switch and may set the starting clutch to drive the shaft 37. Any suitable starting clutch may be employed for this purpose, the clutch illustrated being a well known form. The starting clutch is contained in the hub of a pulley 135 mounted upon the shaft. The clutch mechanism contained in the pulley is shown by Figs. 1 and 29. The pulley is loosely mounted upon the shaft and is presumably driven continuously in one direction by a belt (not shown). The hub of the pulley is bored out for the reception of a collar 136 affixed to the shaft, and is provided with one or more clutch teeth 137 which are adapted to engage a clutch pin 138 mounted in the collar. The pin 138 is adapted to slide to and from the path of the teeth 137, and it is controlled by a starting rod 139. The starting rod is mounted to slide in suitable bearings in the frame 35 so that it will be movable transversely toward and from the shaft 37. A head 140 on the outer end of the pin 138 is formed with a beveled face 141 which is adapted to engage the starting rod 139. A follower 142 arranged to slide in a suitable socket in the collar 136 is subject to the force of a compression spring 143 and is rigidly connected to the clutch pin 138, as shown by Fig. 29, so that the force of the spring 143 will be transmitted to the starting pin to normally project the same into operative relation with the clutch teeth 137. The function of the starting rod 139 is to hold the clutch pin 138 out of driving position, as shown by Fig. 29. The starting rod is normally held in coöperative relation with the head 140 by a spring 144 which is compressed between a portion of the frame 35 and a collar 145 affixed to the starting rod. When the starting rod is depressed against the tension of the spring 144 it may be retracted from engagement with the head 140, whereupon the starting pin 138 will be projected into driving relation by its spring 143. In this way driving connection is formed between the continuously driven pulley and the shaft. The shaft will continue to rotate so long as the starting rod 139 is held depressed, but when the starting rod is released it will be restored by its spring 144 to the position shown. The head 140, revolving with the clutch, will engage the upper end of the starting rod and will be retracted by the action of the inclined face 141 so as to disengage the clutch pin 138 from the driving tooth 137.

The levers 132 and 133 by which the cam switch 123 is shifted are connected to the starting rod 139 so that they may be used to effect the setting of the clutch in addition to the function first explained. For this purpose the fulcrum 134 for the levers 132 and 133 is mounted upon the collar 145 affixed to the starting rod. When one of the treadle rods 132ˣ or 133ˣ is depressed, the pins 124 and 125 may or may not be shifted, depending upon their position; but in any event the starting rod 139 will be depressed to effect the setting of the clutch. If the operator selects the treadle rod which will effect a shifting of the pins 124 and 125, the shifting movement of the pins will take place before the starting rod 139 is depressed, because there is no appreciable resistance afforded by the pins and they will respond more readily than the starting rod 139 which is subject to the force of the spring 144.

From the foregoing description of the cam switch mechanism it is obvious that the switch is not shifted immediately when the pins 124, 125, are shifted, but that the switch will remain in its prior position until the cam has been rotated so far as to move the slide 126 into engagement with one of the pins.

When the work is released by the feed jaws it is clamped upon the hook-supporting member 41 by a yielding presser-foot 146. The presser-foot and hook-supporting member remain in coöperative clamping relation throughout the period when the feed jaws are opened and are returning to their median position, and the presser-foot is not retracted from the hook-supporting member until after the feed jaws have closed upon the work. The presser-foot is, of course, retracted prior to the beginning of feeding movement, but it is moved back into clamping relation at the end of each feeding movement and prior to the opening of the jaws. The work is therefore held at all times either by the feeding jaws or by the presser-foot and hook-supporting member. The presser-foot is illustrated by Figs. 1, 3, 8 and 9, and is adjustably attached to a transverse member 147 at the lower end of a plunger 148. The plunger is fitted to slide in a suitable guide in the frame 35 and is provided with a stud 149 which is engaged by a bell crank 150. The bell crank is mounted upon a fulcrum stud 151 projecting from the frame 35 and is connected by a link 152 with an operating lever 153 (see Fig. 19) mounted upon a fulcrum stud 154 projecting from the frame 35. The lever 153 has a cam roll 155 which coöperates with a cam 156 on the shaft 37. A spring 157 connected to the link 152 and to a suitable fixture on the frame normally holds the presser-foot against the hook-supporting member and keeps the cam roll 155 against its cam.

A work guide or gage 158 is shown by Figs. 1, 8, 10 and 16. The work-engaging portion of the guide extends horizontally between the feed jaws, and it is provided with two arms 158ˣ which extend toward the rear of the machine and which are fixed by setscrews in suitable bosses on the frame.

The hook-supporting member 41 is provided with a hook-positioning member 160, illustrated by Figs. 1, 8, 9, 10, 12, 21, 22 and 23. The function of the hook-positioning member is to engage the hook on the hook-supporting member and keep it in alinement with the anvil. For this purpose the hook-positioning member is provided with two fingers 161 which are separated sufficiently to admit the head of a hook between them. The confronting faces of the fingers are adapted to engage the sides of the hook and prevent lateral movement of the hook. The hook-supporting member is provided with a retaining device 160ˣ for the purpose of preventing dislodgment of the hook toward the rear. The retaining device, which is of well known construction, is pivotally mounted in the member 41 and is adapted to engage the head of a hook as shown by Fig. 8. The device is normally held in engagement with a hook by a compression spring. The member 160 is adapted to slide upon the horizontal surface 162 at the upper end of the plunger 39 and is held upon the surface 162 by the under face 163 of the hook-supporting member. The forward end of the member 160 is pivotally connected to a pin 164 which has telescopic engagement with a lever 165. The lever is mounted upon a fulcrum pin 166 and its lower end is provided with a cam roll 167 which coöperates with a cam 168 on the shaft 37. (See Fig. 25). A spring 169 connected to the lever 165 normally holds the member 160 in operative position and keeps the roll 167 against the cam 168. The cam is so timed as to retract the member 160 upon the completion of a setting operation and prior to the feeding movement of the jaws 85 and 86. The retraction of the member 160 carries the fingers 161 out of the path of feeding movement of the hook which has just been clenched in the work, and it is immaterial whether the work be fed to the left or to the right.

The cams for raising the presser-foot and for opening the feed jaws are both timed to permit the presser-foot and feed jaws to remain in clamping relation upon the work when the machine is at rest. Any appropriate means may be provided for raising the presser-foot and for opening the feed jaws against the tension of their respective springs, for the purpose of inserting and removing the work. Fig. 31 illustrates a device for accomplishing this purpose. The device comprises a bell crank 170 from which two pins 171 and 172 project laterally. The bell crank is adapted to be attached to the frame 35 in such position as to place the two pins behind the levers 113 and 153 respectively, as shown. A rod 173 may be used to connect the bell crank with a suitable treadle (not shown). When the bell crank is arranged in the relation shown, the levers 113 and 153 may both be moved when the treadle rod is depressed, with the result of raising the presser foot and opening the feed jaws. The arrangement of the pins 171, 172, does not interfere with the movements imparted to the respective levers by their respective cams. The bell crank may be normally held retracted against a stop pin 174 by means of a spring 175.

The drawings illustrate mechanism for feeding the lacing hooks from the reservoir 42 into the upper end of the raceway 43. This mechanism is shown by Figs. 1, 3 and 30. A rotatable feeding disk 176 of well known construction is arranged in the reservoir and is affixed upon a shaft 177. The shaft is driven step by step in one direction by driving mechanism which is adapted to yield for the purpose of avoiding breakage of parts in case a hook becomes stuck. The motive power for the feeding disk 176 is taken from a pulley 178 affixed to the main driving pulley 135. A belt 179 passing over the pulley 178 drives a pulley 180 on a stud 181. Rotation of the pulley 180 is transmitted by a pulley 182, belt 183 and pulley 184 to a crank shaft 185. A disconnectible clutch is provided for connecting the pulleys 180 and 182 so that the feeding disk 176 may be disconnected without stopping the rotation of the main pulley 135. For this purpose the pulley 180 is loosely mounted upon the stud 181 and is held thereon by a collar 186 pinned to the stud. A sleeve 187 loosely mounted on the stud 181 carries a pin 188 which extends through the pulley 182 and is adapted to be inserted in and withdrawn from a socket 189 in the hub of the pulley 180. The sleeve 187 may be engaged by a finger to manually connect or disconnect the pulleys 180 and 182.

The shaft 185 is provided with a crank pin 190 which oscillates a lever 191 through the medium of a longitudinally extensible connecting rod. The connecting rod comprises two members, indicated respectively at 192 and 193, said members being connected respectively to the crank pin and to the lever. The member 193 is formed with a socket, as shown by Fig. 30, and the member 192 is formed with a spindle which occupies the socket and is adapted to have telescopic movement therein. The two members of the connecting rod are normally drawn together by springs 194.

The lever 191 is mounted upon a fulcrum stud 195, and its free end is connected by a link 196 with a vertically movable slide 197. The slide is in turn connected by a link 198 with an oscillatory pawl carrier 199 loosely mounted upon the shaft 177. A pawl 200 pivotally mounted on the carrier 199 is adapted to coöperate with a ratchet 201 affixed to the shaft 177. A spring 202 mounted upon the carrier 199 engages the pawl and is adapted to normally hold it against the ratchet.

I claim:

1. In a machine for setting lacing hooks, coöperative jaws adapted to grip the work and move laterally, and mechanism for operating the jaws to feed the work step by step and return the jaws to the same position after each feeding step, the same mechanism being adapted to impart feeding movement in the reverse direction.

2. In a machine for setting lacing hooks, coöperative jaws adapted to feed the work, means for operating said jaws on one side of a median position to feed the work step by step in one direction and return them to said median position after each feeding movement, the same means being adapted to operate the jaws in like manner on the other side of said median line to reverse the direction of feeding movement, and manually operative means for acting upon said reversible feed mechanism to reverse the direction of feeding movement.

3. In a machine for setting lacing hooks, coöperative jaws adapted to feed the work, means for opening and closing the jaws, a cam and operating connections between the cam and jaws for reciprocating the jaws laterally to impart feeding movement, said cam being adapted to move said connections and jaws through one range of movement to feed in one direction, or through a different range of movement to feed in the reverse direction.

4. In a machine for setting lacing hooks, coöperative jaws adapted to feed the work, means for opening and closing the jaws, a cam and operating connections between the cam and said jaws for imparting feeding movement in one direction, and means adapted to be controlled manually for causing said cam and connections to impart feeding movement wholly in the opposite direction, or to reverse the direction of feeding movement.

5. In a machine for setting lacing hooks, means for feeding the work laterally, hook-setting mechanism including a hook-supporting member, an anvil adapted to coöperate therewith to set a hook, and means having confronting faces adapted to engage opposite sides of the head of a hook during the setting operation to fix the lateral position of the hook on said supporting member, said means being retractible with relation to said supporting member to permit sidewise feeding movement of the work.

6. In a machine for setting lacing hooks, means for feeding the work laterally, and hook-inserting mechanism including a hook-supporting member fixed as to lateral movement, an anvil adapted to coöperate therewith to set a hook, and a hook-positioning member adapted to move to and from the path of feed of the hook, said positioning member having confronting portions adapted to confine the head of the hook between them while the hook is undergoing a setting operation upon said supporting member.

7. In a machine for setting lacing hooks, means for feeding the work laterally, and hook-setting mechanism including a hook-supporting member, a hook-positioning member, and an anvil adapted to coöperate with said hook-supporting member, said supporting member being movable toward and from said anvil but fixed as to lateral movement, said positioning member being movable with said supporting member and movable transversely thereof to and from the path of feed of the hook, and means for moving said positioning member transversely to and from operative position.

8. In a machine for setting lacing hooks, hook-inserting mechanism comprising an anvil and a hook-supporting member movable toward and from the anvil, and a presser-foot adapted to coöperate with said hook-supporting member to hold the work.

9. In a machine for setting lacing hooks, hook-inserting mechanism comprising an anvil and a hook-supporting member, step-by-step work-feeding mechanism comprising coöperative jaws adapted to open and close and move laterally, and a presser-foot adapted to coöperate with said hook-supporting member to clamp the work, said jaws and presser-foot having operating means whereby they are operated so that the work will be clamped at all times either by said jaws or by said presser-foot and hook-supporting member, the work being otherwise unsupported.

10. In a machine for setting lacing hooks, an anvil, a presser-foot, a hook raceway, a hook-feeding device, and a hook-supporting member adapted to receive a hook from said raceway and move with the hook toward said anvil and presser-foot, by which movement the hook is set and the work is clamped by coöperation of said hook-supporting member and presser-foot.

11. In a machine for setting lacing hooks, a clutch, means adapted to be driven by said clutch to feed the work in either of two directions, a manually movable member, means adapted to be operated by a movement of said member to connect the clutch, and means adapted to be operated by said movement of said member to determine the direction of feed.

12. In a machine for setting lacing hooks, a clutch, means adapted to be driven by said clutch to feed the work in either of two directions, a controlling device adapted to occupy either of two positions whereby it will determine the direction of feeding movement, and a member adapted to be manually operated and by a single movement to position said controlling device and set the clutch.

13. In a machine for setting lacing hooks, an anvil, a lacing-hook plate adapted to coöperate with the anvil to set a hook, a support for said plate, the ends of said plate being unobstructed to permit sidewise feeding movement and removal of the hook, and means having sliding engagement with said plate and support for bracing the plate against the stress of the anvil, said means being movable to and from the path of the hook and adapted to engage the sides of the head of the hook to prevent sidewise displacement of the hook.

14. In a machine for setting lacing hooks, a clutch, means adapted to be driven by said clutch to feed the work in either of two directions, two manually movable members, means adapted to be actuated by a movement of either of said members to connect the clutch, and means adapted to be actuated by such movement of one of said members to cause one direction of feed, the latter means being adapted to be actuated by such movement of the other member to cause feeding in the other direction.

15. In a machine of the character described, coöperative feeding jaws, means for operating said jaws, the work-engaging portions of said jaws being swiveled to turn on an axis transverse to the plane of feeding movement.

16. In a machine of the character described, coöperative feed jaws movable laterally in an arc of a circle, and a work guide having a work-engaging surface coextensive with the feeding movement of the jaws and concentric to said arc of movement of the jaws.

17. In a machine for upsetting metallic members in the uppers of boots or shoes, coöperative members for feeding the work, means for imparting to said feeding members feeding movement in one direction, said means being adapted to impart feeding movement in the opposite direction, a presser-foot having a work-engaging surface coextensive with the maximum range of movement of said feeding members, and a surface adapted to coöperate with said presser-foot throughout the range of movement of said feeding members.

18. In a machine for upsetting metallic members in the uppers of boots or shoes, coöperative members for feeding the work, operating connections for said feeding members, a cam for reciprocating said connections to impart feeding movement, said cam having means for causing the feeding movement in one direction or in the opposite direction, and means for changing the relation of said operating connections to vary the length of feeding movement in either direction.

19. In a machine for upsetting metallic members in the uppers of boots or shoes, coöperative members for feeding the work, operating connections for said feeding members, a cam disk having two sets of actuating faces for moving said connections, a shiftable member carried by said cam disk for causing said connections to coact with one set of cam faces or with the other set, whereby the feeding movement is caused in one direction or in the opposite direction, a member mounted to slide back and forth in said cam disk, means for transmitting movement from said sliding member to said shiftable member to change the direction of feed, and means for moving said sliding member back and forth.

20. In a machine for upsetting metallic members in the uppers of boots or shoes, coöperative members for feeding the work, operating connections for said feeding members, a cam disk having two sets of actuating faces for moving said connections, a shiftable member carried by said cam disk for causing said connections to coact with one set of cam faces or with the other set, whereby the feeding movement is caused in one direction or in the opposite direction, and coactive relatively movable members for actuating said shiftable member, one of said actuating members being mounted to slide back and forth in said cam disk and having connection with said shiftable member for transmitting movement thereto, the ends of said one of said actuating members projecting beyond the cam disk, said actuating members having beveled faces for effecting back and forth movement of said sliding member.

In testimony whereof I have affixed my signature, in presence of two witnesses.

ANDREW RAICHE.

Witnesses:
 E. N. CHERRY,
 P. W. PEZZETTI.